(12) United States Patent
Cornelius

(10) Patent No.: US 8,840,149 B1
(45) Date of Patent: Sep. 23, 2014

(54) FIRE HOSE ADAPTER

(76) Inventor: Michael Cornelius, Phoenix, AZ (US)

( * ) Notice: Subject to any disclaimer, the term of this patent is extended or adjusted under 35 U.S.C. 154(b) by 328 days.

(21) Appl. No.: 13/491,531

(22) Filed: Jun. 7, 2012

Related U.S. Application Data

(60) Provisional application No. 61/539,850, filed on Sep. 27, 2011.

(51) Int. Cl.
F16L 37/00 (2006.01)
(52) U.S. Cl.
USPC ............... 285/317; 285/86; 285/322; 285/34; 285/308

(58) Field of Classification Search
USPC ................. 285/34, 33, 35, 317, 322, 86, 308; 279/17, 47, 48
See application file for complete search history.

(56) References Cited

U.S. PATENT DOCUMENTS 4,606,557 A * 8/1986 Coffey ............................ 285/18

* cited by examiner

Primary Examiner — James Hewitt
Assistant Examiner — Jay R Ripley
(74) Attorney, Agent, or Firm — Plager Schack LLP

(57) ABSTRACT

A fire hose adapter comprises a locking huh mechanically coupled to a locking ring. The locking hub is immediately adjacent to a first wedge segment and a second wedge segment. The locking hub is mechanically coupled to a holding plate.

3 Claims, 2 Drawing Sheets

FIRE HOSE ADAPTER

CROSS REFERENCE TO RELATED APPLICATIONS

This application claims priority to U.S. Provisional Application No. 61,539,850 filed on Sep. 27, 2011, which is incorporated by reference in its entirety.

FIELD OF THE INVENTION

This invention relates to fire hose couplings, adaptors and fire department connections on buildings.

BACKGROUND OF THE INVENTION

Metal thieves rarely consider the long term ramifications of removing metal from safety equipment. The rise of metal theft in recent years has been in large part to an increased recognition of thieves of the variety of metal that can be stolen, and the ease at which this metal can be stolen. A fire department connection (FDC) on the exterior of a building gives firefighters a place to connect hoses to supplement the building's fire suppression system with additional water and pressure. The FDC is frequently made from brass and is valuable to vandals for that reason. The difficulty presented is that without the couplings desired by thieves, there is no way to insert or connect fire hoses into the FDC.

The disclosed invention solves that problem.

BRIEF SUMMARY OF THE INVENTION

The invention comprises a locking hub mechanically coupled to a locking ring. The locking hub is immediately adjacent to a first wedge segment and a second wedge segment. The locking hub is mechanically coupled to a holding plate.

BRIEF DESCRIPTION OF THE SEVERAL VIEWS OF THE DRAWINGS

Figure 1:
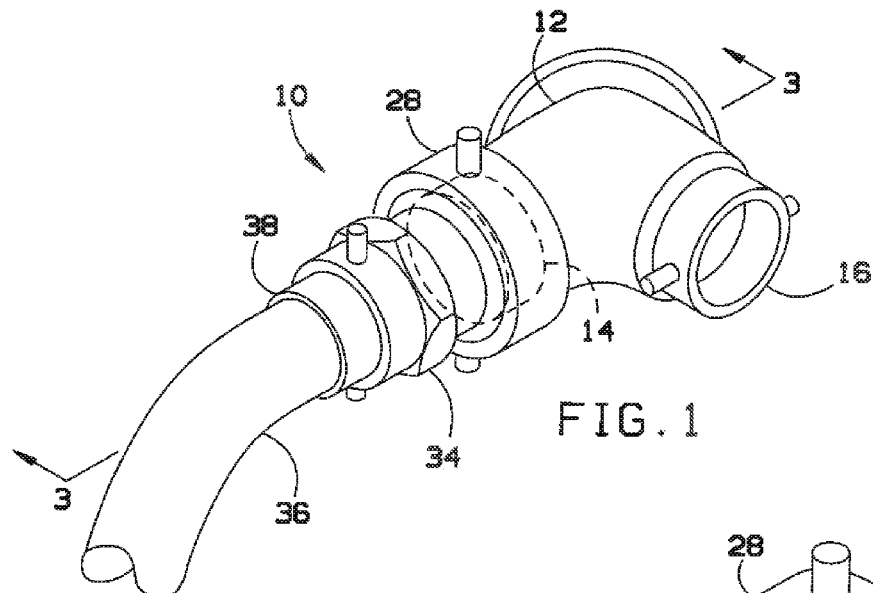

Having thus described the invention in general terms, reference will now be made to the accompanying drawings, which are not necessarily drawn to scale, and wherein:

FIG. 1 is a perspective view of the fire hose adapter.

Figure 2:
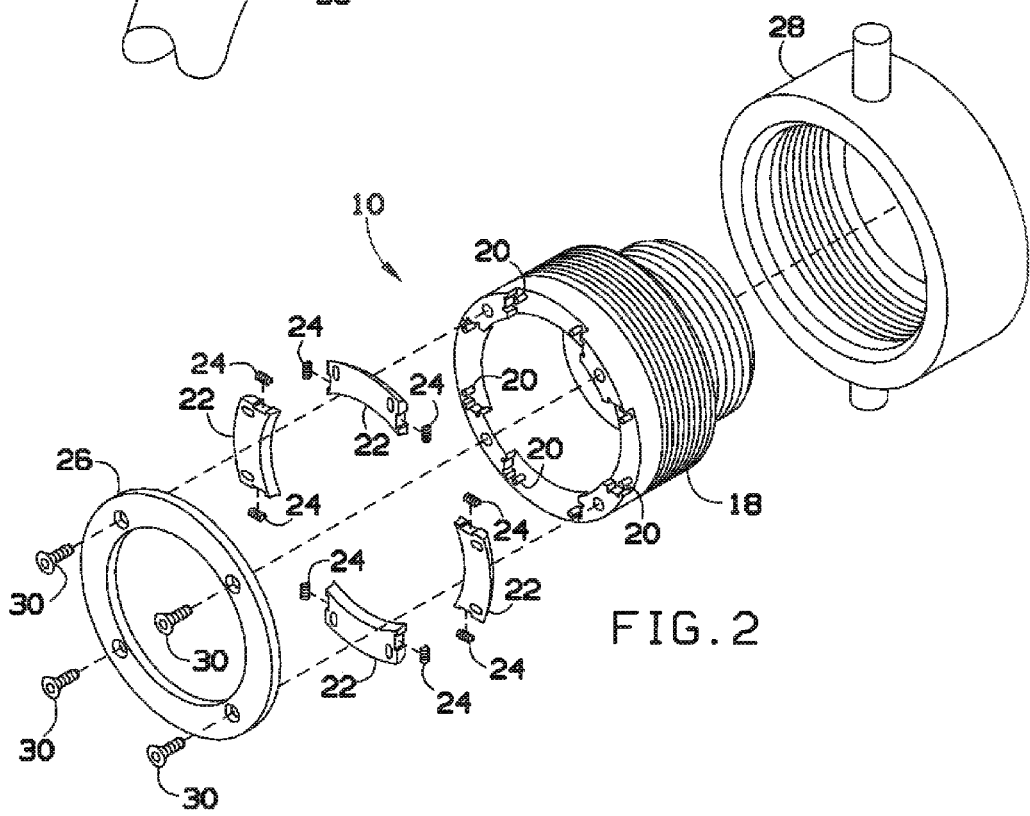

FIG. 2 is an exploded perspective view of the fire hose adapter.

Figure 3:
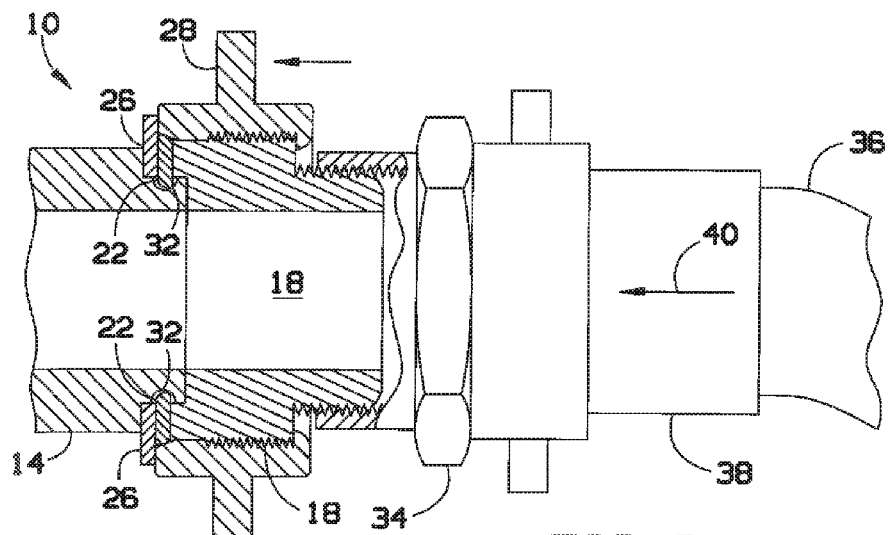

FIG. 3 is a detailed section view of the fire hose adapter taken along line 3-3 in FIG. 1 shown connected to vandalized connection 14.

Figure 4:
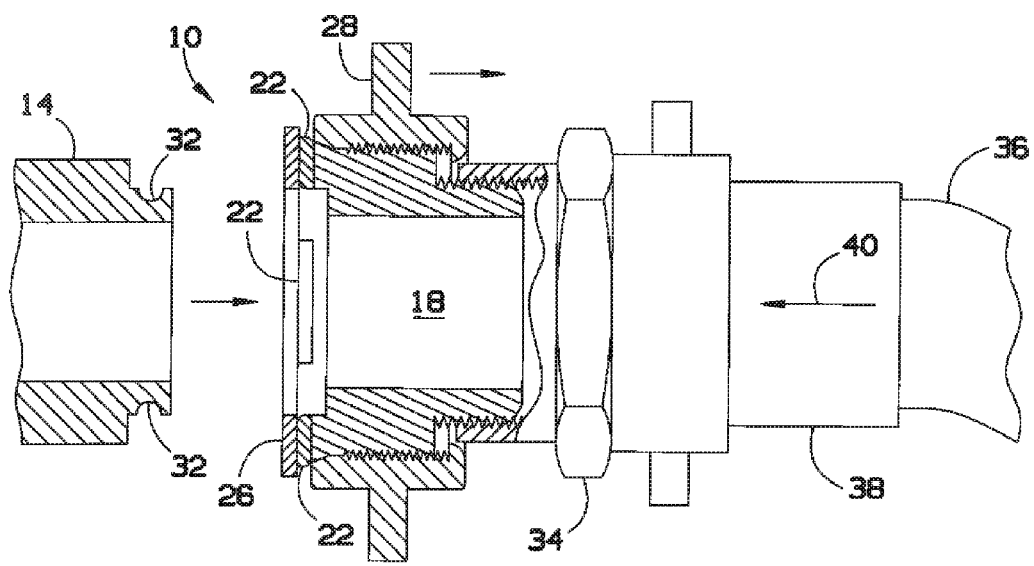

FIG. 4 is a detailed section view of the fire hose adapter shown disconnected the vandalized connection.

DETAILED DESCRIPTION OF THE INVENTION

Embodiments of the present invention overcome many of the obstacles associated with vandalized fire department connections (FDCs), and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows fire hose adapter 10 in use. Fire department connection 12 is shown here with non-vandalized connection 16 and vandalized connection 14. Non-vandalized connection 16 comprises a female end for a male fire hose, vandalized connection 14 does not comprise a female end for male fire house. The user can attach a fire hose to vandalized connection 14 by using fire hose adapter 10.

Male threaded end 38 of fire hose 36 is mechanically coupled to the female fire hose coupling of appliance 34. Threaded appliance 34 is mechanically coupled to locking hub 18 as shown in more detail in FIG. 3 and FIG. 4.

FIG. 2 shows an exploded perspective view of fire hose adapter 10. Locking ring 28 is mechanically coupled to locking hub 18. Locking hub 18 comprises a first screw hole, a second screw hole, a third screw hole, a fourth screw hole, a first wedge segment guide pin 20, a second wedge segment guide pin 20, a third wedge segment guide pin 20, a four wedge segment guide pin 20, a fifth wedge segment guide pin 20, a six wedge segment guide pin 20, a seven wedge segment guide pin 20, and an eighth wedge segment guide pin 20.

First wedge segment 22 can be slid onto first wedge segment guide pin 20 and second wedge segment guide pin 20 along with first spring 24 and second spring 24. Second wedge segment 22 can be slid onto third wedge segment guide pin 20 and four wedge segment guide pin 20 along with third spring 24 and fourth spring 24. Third wedge segment 22 can be slid onto fifth wedge segment guide pin 20 and sixth wedge segment guide pin 20 along with fifth spring 24 and sixth spring 24. Fourth wedge segment 22 can be slid onto seventh wedge segment guide pin 20 and eighth wedge segment guide pin 20 along with seventh spring 24 and eighth spring 24.

Holding plate 26 is immediately adjacent to first wedge segment 22, second wedge segment 22, third wedge segment 22, and fourth wedge segment 22. Holding plate 26 is mechanically coupled to locking hub 18 by inserting first plate screw 30 through holding plate 26 and into the first screw hole. Further, second plate screw 30 is inserted through holding plate 26 and into the second screw hole. Further, third plate screw 30 is inserted through holding plate 26 and into the third screw hole. Further, forth plate screw 30 is inserted through holding plate 26 and into the fourth screw hole.

FIG. 3 uses a section view of the fire hose adapter in use. As noted above the goal of fire hose adapter 10 is to allow water to move from fire hose 36 through vandalized connection 14 and into the fire sprinkler, fire standpipe and other fire protection equipment. Vandalized connection in 14 comprises vandalized connection groove 32. Wedge segment 22 can be held into vandalized connection groove 32 by holding plate 26 and locking ring 28 as shown. As noted above, locking ring 28 is mechanically coupled to locking hub 18. Locking hub 18 is mechanically coupled to throated appliance 34 threaded appliance 34 is mechanically coupled to fire hose and 38, which is further mechanically coupled the fire hose 36.

FIG. 4 shows a section view of fire hose adapter 10. Here, vandalized connection 14 comprises vandalized connection groove 32. A user can insert fire department adapter 10 immediately adjacent to vandalized connection 14 such that wedge segment 22 fits inside vandalized connection groove 32 as shown in FIG. 3.

Locking hub 18, locking ring 28, wedge 22, and holding plate 26 can be made from any material. Preferably, Locking hub 18, locking ring 28, wedge 22, and holding plate 26 are made from metal using any conventional metalworking technology. Of all metals, brass is preferred.

That which is claimed:

1. A fire hose adapter, configured to connect a fire hose to a vandalized fire department connection comprising a groove offset from a flat surface; the fire hose adapter comprising:
   a locking ring with internal threads;
   a locking hub coupled with threads to receive the locking ring;
   a first wedge segment and a second wedge segment attached to the locking hub and biased radially outward of the locking hub with at least two springs;
   the locking hub is coupled to a holding plate, the holding plate being immediately adjacent to the locking hub and configured to offset the first wedge and the second wedge from the vandalized fire department connection and into the groove;
   wherein threading the locking ring around the locking hub compresses the first wedge and the second wedge into the groove and attaches the fire hose adapter to the vandalized fire department connection.

2. The fire hose adapter of claim 1, further comprising,
   where the locking hub is immediately adjacent to a third wedge and a fourth wedge; and
   where the locking hub is mechanically coupled to a threaded appliance.

3. The fire hose adapter of claim 1, further comprising,
   where the locking hub is immediately adjacent to a third wedge segment and a fourth wedge segment;
   where the first wedge segment is immediately adjacent to a first spring and a second spring;
   where the second wedge segment is immediately adjacent to a third spring and a fourth spring;
   where the third wedge segment is immediately adjacent to a fifth spring and a sixth spring;
   where the fourth wedge segment is immediately adjacent to a seventh spring and an eighth spring;
   where the locking hub is mechanically coupled to a threaded appliance.

* * * * *